Sept. 2, 1941.                R. BOWLIN                2,254,414
                        LAND LEVELING MACHINE
                        Filed March 17, 1941
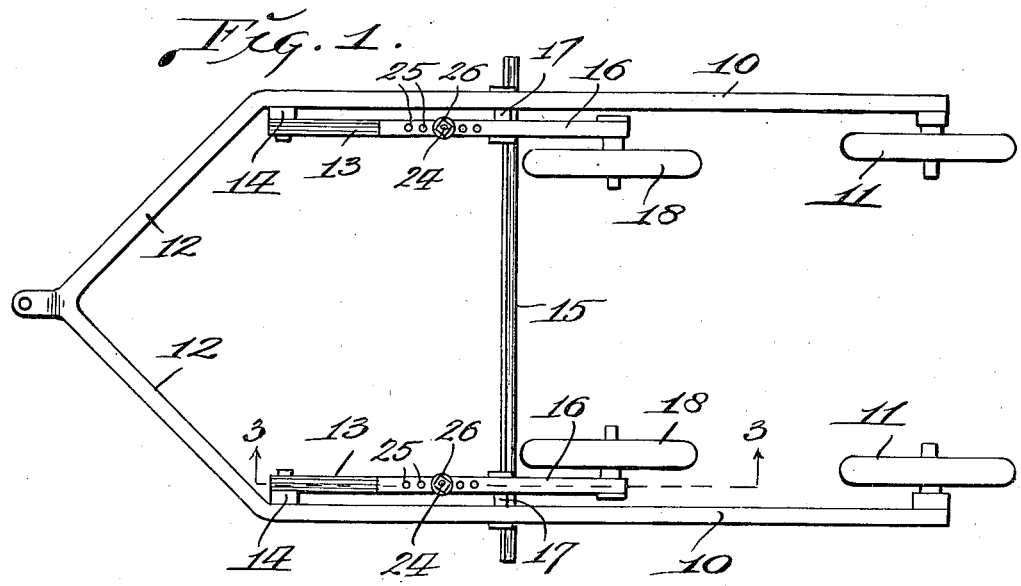
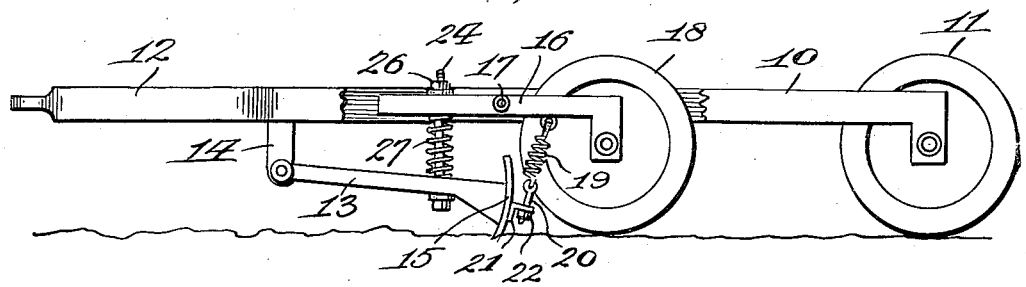
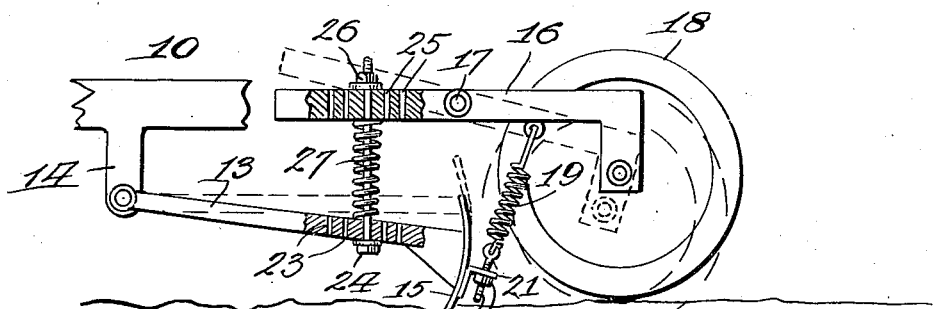
INVENTOR:-
ROBERT BOWLIN.
By Martin P. Smith, ATTY.

Patented Sept. 2, 1941

2,254,414

UNITED STATES PATENT OFFICE 2,254,414

LAND LEVELING MACHINE

Robert Bowlin, Indio, Calif.

Application March 17, 1941, Serial No. 383,708

5 Claims. (Cl. 37—153)

My invention relates to a land leveling machine and has for its principal object, the provision of a relatively simple, practical and inexpensive machine having a transversely disposed earth-engaging scraper blade that acts automatically as the machine moves forwardly, to level the surface of the ground over which the machine travels by cutting off the high spots on the surface of the ground and pushing the volume of loose dirt forwardly until a low spot or depression in the surface of the ground is encountered, whereupon the scraper blade is elevated to permit the earth in front of said blade to discharge into and fill the low spot or depression.

A further object of my invention is, to provide a land leveling machine of the character referred to having a scraper blade that is controlled in its operation by wheels carried by beams or arms that are pivoted on the main frame of the machine for vertical movement and which beams are connected to the scraping blade by flexible connections that may be adjusted so as to regulate the scraping action of said blade.

With the foregoing and other objects in view, my invention consists in certain novel features of construction and arrangement of parts that will be hereinafter more fully described and claimed and illustrated in the accompanying drawing in which:

Fig. 1 is a top plan view of a land leveling machine constructed in accordance with my invention.

Fig. 2 is a side elevational view of the machine.

Fig. 3 is an enlarged vertical section taken on the line 3—3 of Fig. 1.

Referring by numerals to the accompanying drawing which illustrates a preferred embodiment of my invention, 10, 10 designate the side rails of the main frame of the machine, the rear portions of which side rails are supported by wheels 11 and the forward ends of said side rails are connected by inclined arms 12, the forward ends thereof being connected to each other and adapted to be connected to the tractor that is utilized in drawing the machine over the ground that is to be leveled.

The forward ends of arms 13 that are disposed below and substantially parallel with the forward portions of the rails 10 of the main frame are pivotally connected for vertical swinging movement to brackets 14 that depend from the rails 10, and the rear ends of these rails are directly connected to the end portions of a transversely disposed earth-engaging scraper blade 15.

Disposed adjacent and parallel with the intermediate portions of the side rails 10 of the main frame and above the rear portions of the arms 13 are longitudinally disposed arms 16. Each arm 16 is pivotally mounted intermediate its ends as designated by 17 to the adjacent rail 10 and journalled in suitable bearings on the rear end of each arm is a wheel 18. The upper end of a tension spring 19 is connected to each arm 16 between its intermediate pivot point and its rear end and the lower end of each spring is connected to an eye bolt 20, the threaded shank of which passes through a bracket 21 that is secured to the rear side of blade 15 and mounted on this shank below the bracket is a nut 22 which may be manipulated to vary the tension of said spring 19.

Formed through the rear portions of the blade carrying arms 13 are vertically disposed apertures 23 that are adapted to receive the lower headed end portions of bolts 24. These bolts extend upwardly through apertures 25 that are formed in the forward portions of the depth gauge arms 16 and mounted on the threaded upper end portions of said bolts and bearing on the upper faces of said arms 16 are nuts 26. Carried by each bolt 24 and disposed between the arms 13 and 16 is an expansive coil spring 27.

The provision of a plurality of apertures 23 in each arm 13 and a plurality of apertures 25 in each arm 16 enables the spring carrying bolt 24 to be moved toward or away from the pivot point 17 of the depth gauge arm 16 and correspondingly vary the leverage exerted by the depth gauge arms 16 that carry the wheels 18. The nuts 26 provide means for varying the tension of the springs 27.

Under normal conditions and with the depth gauge wheels 18 traveling over fairly level ground, the depth gauge arms 16 occupy positions so as to act through the compression springs 27 to cause the leveling blade to cut into the ground and scrape at a pre-determined depth.

In the event that the depth gauge wheels 18 enter a recess or depression in the surface of the ground, the depth gauge arms will be swung on their pivots 17, with the tension springs 19 pulling downwardly on the rear portions of said arms, with the result that the forward ends of said arms will move upward, thereby elevating the rear ends of the arms 13 and the scraper blade 15, with the result that the loose dirt in front of said scraper blade will be deposited into the recess or depression.

In the event that the depth gauge wheels 18 pass over a high spot or slight elevation on the surface of the ground, the wheels 18 will be correspondingly elevated, which swings the forward ends of the arms 16 downwardly and the springs 27 exert downward pressure upon the blade carrying arms 13, thereby causing blade 15 to cut deeper into the ground and particularly the elevated portion thereof, and the dirt thus cut by the scraper will be pushed forwardly until another recess or depression is encountered.

An especially desirable feature of my improved leveling machine is that where the machine is traveling over ground that is comparatively level and with the blade cutting at a set depth, slight vertical movement of the depth gauge wheels occurs from time to time, and although this vertical movement is slight it is transmitted to the leveling blade 15 so as to slightly elevate the latter, thereby preventing loose dirt from packing in front of the leveling blade and also permitting small pieces of trash and weeds to be released when caught directly beneath the cutting edge of the blade.

Thus it will be seen that I have provided a land leveling machine that is relatively simple in construction, inexpensive of manufacture, and very effective in performing the functions for which it is intended.

It will be understood that minor changes in the size, form and construction of the various parts of my improved land leveling machine, may be made and substituted for those herein shown and described, without departing from the spirit of my invention, the scope of which is set forth in the appended claims.

I claim as my invention:

1. In a land leveling machine, a wheel supported frame, arms hinged at their forward ends to the forward portion of said frame, a scraping blade carried by the rear portions of said arms, depth gauge arms pivoted on the frame above said first mentioned arms and the blade carried thereby, wheels mounted on the rear portions of the arms that are pivoted on the frame, retractile springs between said blade and the rear portions of said depth gauge arms and compression springs arranged between the forward portions of said depth gauge arms and the rear portions of the blade carrying arms.

2. A land leveling machine as set forth in claim 1, with means for adjusting the tension of the springs between the blade and depth gauge arms.

3. A land leveling machine as set forth in claim 1 and said compression springs being adjustable longitudinally of said depth gauge arms and said blade carrying arms.

4. In a land leveling machine, a wheel supported frame, arms hinged at their forward ends to the forward portion of said frame, an earth leveling blade carried by the rear ends of said arms and means including depth gauge arms pivoted on said frame, wheels carried by the rear ends of said depth gauge arms and adjustable resilient connections between said depth gauge arms, said blade carrying arms and said blade, for controlling the action of said blade carrying arms and the operation of the blade carried by said arms.

5. A land leveling machine as set forth in claim 4 and with adjustable means for regulating the leverage exerted by said depth gauge arms on the blade carrying arms and blade carried thereby.

ROBERT BOWLIN.